Figure 1:
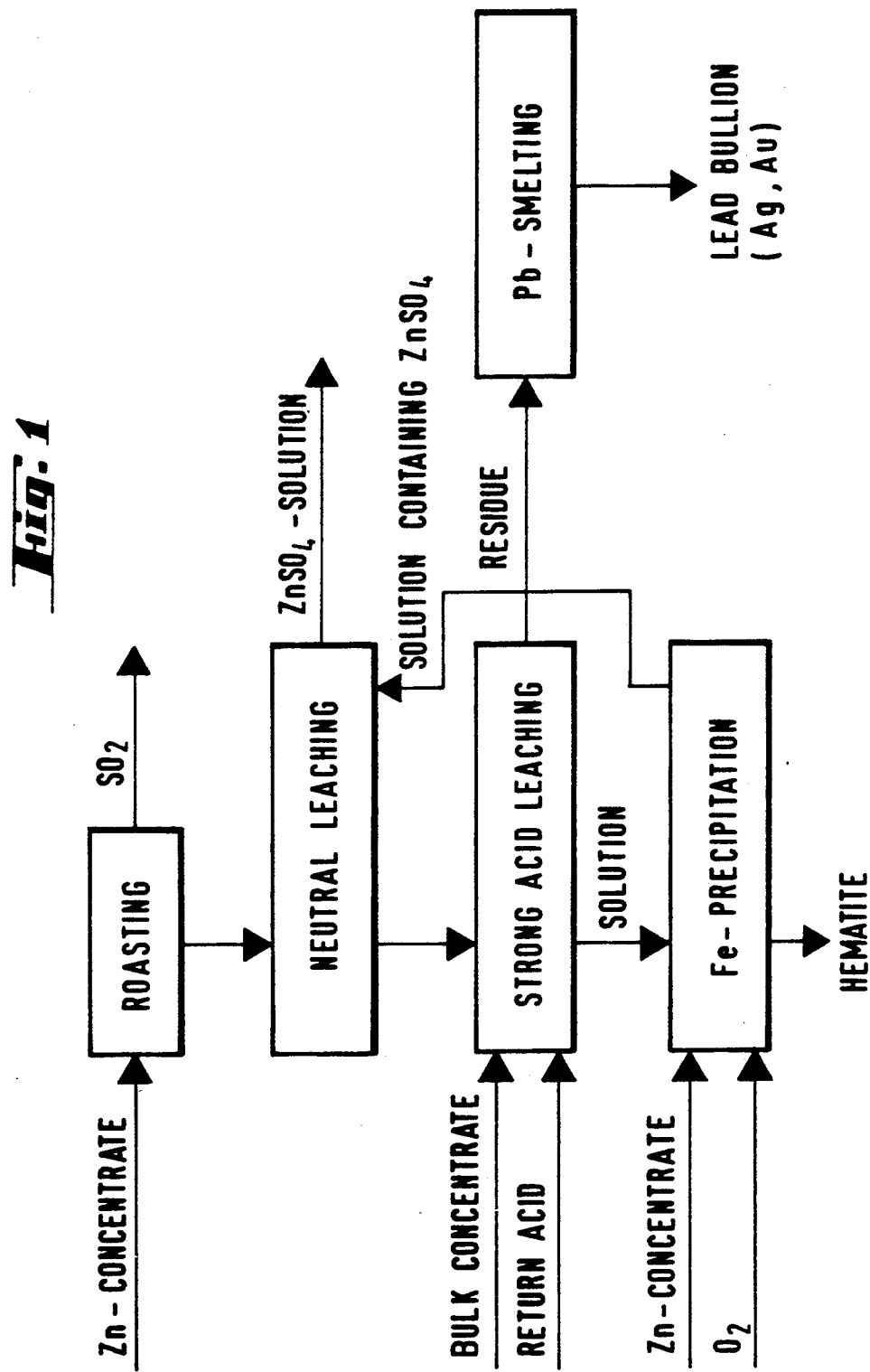

United States Patent

Fugleberg et al.

[11] Patent Number: 5,120,353
[45] Date of Patent: Jun. 9, 1992

[54] HYDROMETALLURGIC METHOD FOR PROCESSING RAW MATERIALS CONTAINING ZINC SULPHIDE

[75] Inventors: Sigmund P. Fugleberg, Turku; Aimo E. Jarvinen, Kokkola, both of Finland

[73] Assignee: Outokumpu Oy, Helsinki, Finland

[21] Appl. No.: 654,505

[22] Filed: Feb. 13, 1991

[30] Foreign Application Priority Data

Feb. 16, 1990 [FI] Finland .................. 900779

[51] Int. Cl.$^5$ .................. C22B 19/00
[52] U.S. Cl. .................. 75/419
[58] Field of Search .................. 75/419

[56] References Cited

U.S. PATENT DOCUMENTS

| | | | |
|---|---|---|---|
| 3,832,162 | 8/1974 | Smith | 75/419 |
| 4,778,520 | 10/1988 | Spink | 75/419 |
| 4,789,446 | 12/1988 | von Ropenack | 75/419 |

Primary Examiner—Peter D. Rosenberg
Attorney, Agent, or Firm—Brooks Haidt Haffner & Delahunty

[57] ABSTRACT

The invention relates to a method for recovering various valuable materials in connection with the hydrometallurgical production of zinc. The method is particularly suited for feeding different types of raw materials into the various stages of a process carried out in atmospheric conditions. Valuable materials such as lead, silver and gold are recovered by means of the said method.

9 Claims, 3 Drawing Sheets

HYDROMETALLURGIC METHOD FOR PROCESSING RAW MATERIALS CONTAINING ZINC SULPHIDE

The present invention relates to a method for recovering various valuable materials in connection with the hydrometallurgic production of zinc. The method is particularly suited for feeding various types of raw materials into the different stages of a process carried out a conditions.

As its main reactant, an electrolytic zinc process uses an oxidic product, i.e. zinc calcine, obtained by roasting sulphidic zinc concentrate. The zinc contained therein is mainly oxidic, to a considerable extent ferrite and to some extent sulphate. The zinc content of the calcinate is generally within 50–65%, iron content 3–12%, and in addition there are other valuable materials such as lead, silver and gold. Complex concentrates and bulk concentrates in particular contain lead, gold and silver.

A considerable part of the zinc in the world is produced by first subjecting the zinc calcine to selective leaching in weak sulphuric acid, then to strong acid leaching or to a conversion stage in order to leach the undissolved ferrites. These processes are described, among others, in the Norwegian patent No. 108,047, and in the Finnish patent No. 50,097. The processes are carried out under atmospheric conditions, and the result is jarosite waste containing the major part of the iron, lead, gold and silver of the calcine.

Recently the possibility to leach zinc concentrate directly, without preceding roasting, has been investigated. The leaching of a mainly sulphidic zinc concentrate has been studied, among others, by Sherritt Gordon Mines Ltd., and their investigations have resulted in a process where the zinc concentrate is leached in an autoclave, either in two steps, or in an autoclave with several sections. This process is described for instance in the paper Recent Advances in the Leaching of Sulphides and the Precipitation of Iron; Proceedings of MINTEK 50: International Conference on Mineral Science and Technology, Sandton, S. Africa, Mar. 26–30, 1984. Sherritt Gordon describes the said method as an oxygen-sulphuric-acid pressure leaching method. As a result, the iron is obtained as jarosite, and the lead and the precious metals are contained therein. The sulphidic sulphur contained in the concentrate is recovered in the process as elemental sulphur, which is flotated. The advantages pointed out are that the roasting plant and the sulphuric acid plant are left out.

For improving the recovery of valuable materials, it has been attempted to develop other methods, too. One such method is described in the article Letowski, F.: Leaching/flotation processing of complex sulphide ores; CIM Bulletin, Oct. 1987, Vol. 80, No. 906, ss. 82–87. The article describes simultaneous direct leaching and flotation of zinc concentrate. Thus the direct leaching of zinc concentrate in a ferric sulphate solution is combined with flotation. Oxygen is also fed into the solution. As a consequence of this combination, zinc is dissolved into a soluble zinc sulphate, there is created a non-soluble lead sulphate, and the sulphur and non-soluble sulphides are separated to the fraction to be flotated according to the following reactions:

(1) $ZnS_{(s)} + Fe_2(SO_4)_{3(aq)} = ZnSO_{4(aq)} + 2FeSO_{4(aq)} + S°_{(s)}$ (2) $PbS_{(s)} + Fe_2(SO_4)_{3(s)} = PbSO_{4(s)} + 2FeSO_{4(aq)} + S°_{(s)}$ (3) $6Fe_2(SO_4)_{3(aq)} + 3/2O_{2(g)} + H_2O_{(l)} = 2FeOOH_{(s)} + 2Fe_2(SO_4)_{3(aq)}$

In the non-flotated fraction, there remain among others the non-dissolved lead sulphate and iron. The elemental sulphur and the precious metals such as gold and silver contained in the concentrate, are separated in the flotated fraction and can now be recovered. Lead is recovered from the non-flotated fraction by means of chloride leaching. The ferrous sulphate created in the reactions is now regenerated back to ferric sulphate in an increased partial pressure of oxygen, and simultaneously the excessive iron is precipitated as goethite.

When the aim is to modernize existing industrial facilities, or when the material basis is only partially changed, it is advantageous to utilize the existing equipment and processes as much as possible. This is exactly the starting-point of the new method of the present invention: in addition to pure zinc concentrate, there is now used, at least partly, for instance lead-containing bulk concentrate, and at the same time the already existing facilities, such as the roasting plant and leaching equipment, are utilized.

Figure 2:
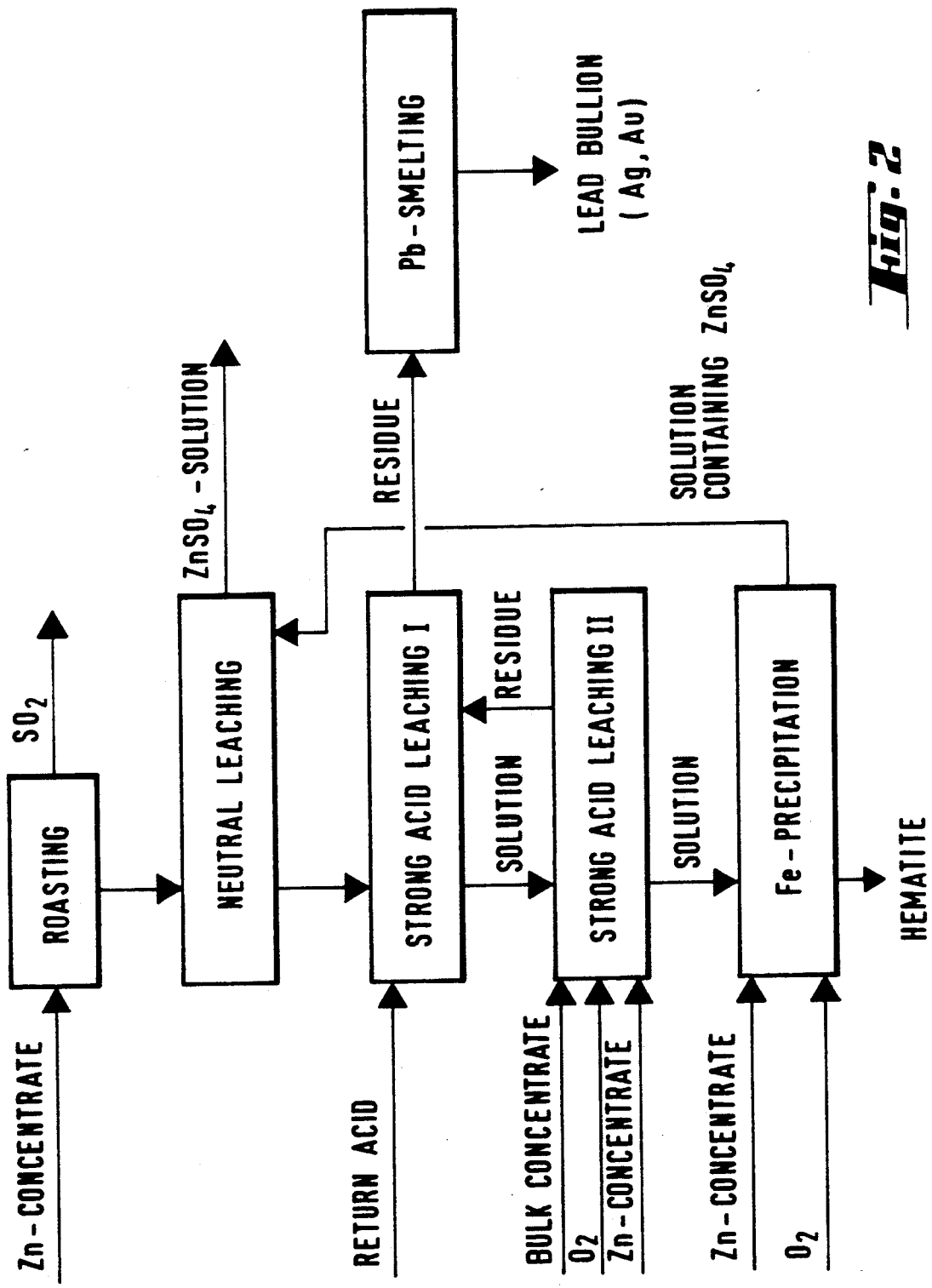
Figure 3:
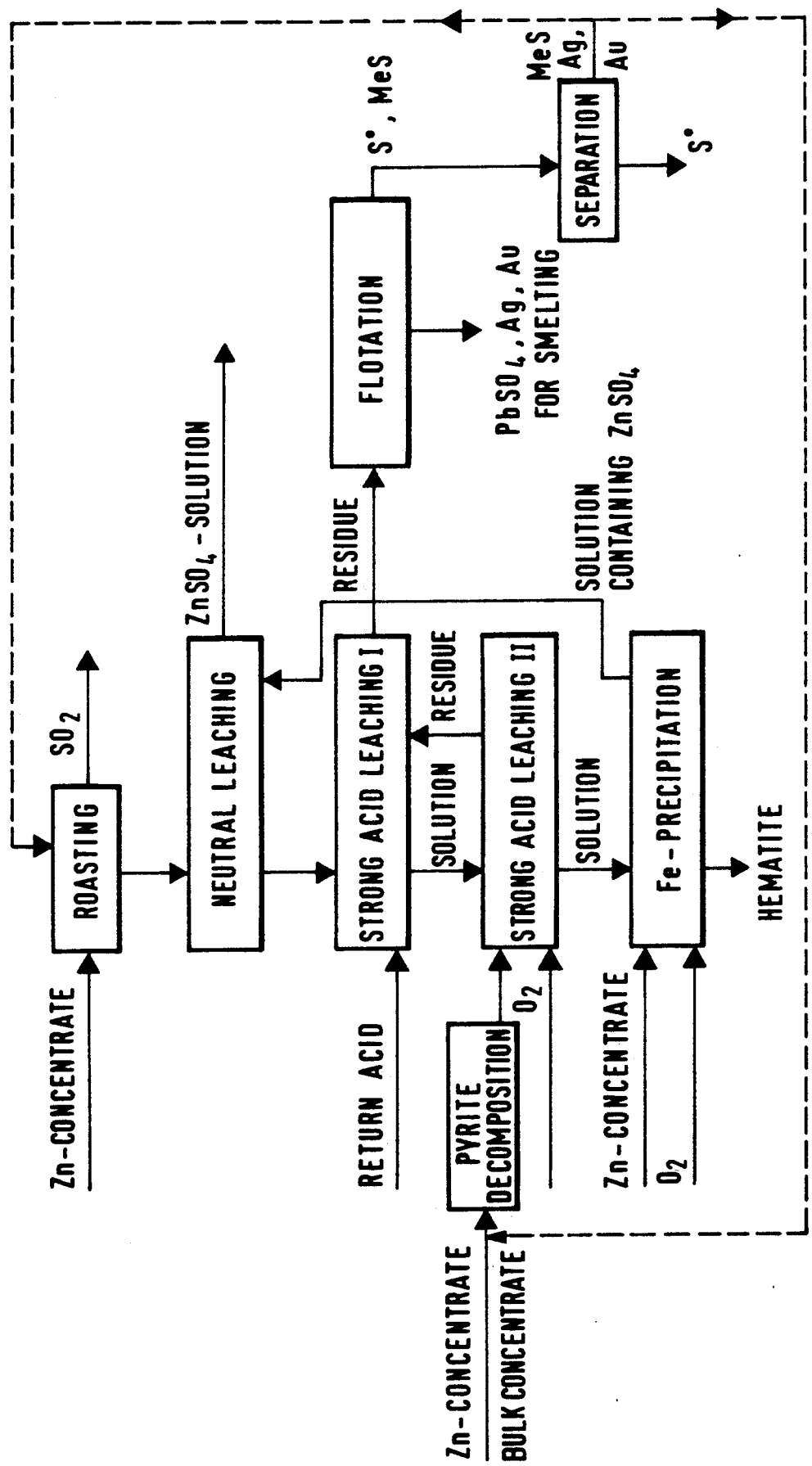

The method of the present invention is also described by means of flowsheets, where FIG. 1 is a flowsheet of the process of the present invention, when the strong acid leaching is carried out in one step, FIG. 2 is a flowsheet of another process of the present invention, when the strong acid leaching is carried out in two steps, and FIG. 3 is a flowsheet of a process of the invention, when the concentrate to be fed in the strong acid leaching is subjected to pyrite decomposition.

In the method of the present invention, ordinary zinc concentrate without any significant amounts of for instance lead, is roasted just as before, and the zinc calcine is first conducted to neutral leaching and then to strong acid leaching. Into the strong acid leaching stage, there is fed sulphuric acid obtained as return acid, and either some bulk concentrate and/or ordinary zinc concentrate, with the idea to leach both the ferrites that were left non-dissolved in the neutral leaching and the sulphides of the bulk concentrate, as well as to oxidize the lead sulphide into lead sulphate. The oxidation of the sulphides, which, apart from lead, is mainly leaching, is based on the utilization of the $Fe^{3+}$ ion. Part, about 15–20% of the required ferric iron is obtained directly, in connection with the leaching of the ferrites, according to the following reaction:

(4) $ZnO \cdot Fe_2O_3 + 4H_2SO_4 = Fe_2(SO_4)_3 + ZnSO_4 + 4H_2O$

As for the created ferric iron, it oxidizes the sulphides of the bulk concentrate fed in the process, according to the above described reactions 1-2, and the reaction (5) below:

(5) $Fe_2(SO_4)_3 + MeS = MeSO_4 + 2FeSO_4 + S°$ where Me is one of the metals zinc, lead, copper or iron. Because the ferric iron created in the leaching of ferrites alone is not sufficient to leach the sulphides of the bulk concentrate, the ferrous iron created in connection with the leaching of the sulphides is regenerated into ferric iron by means of oxygen according to the following reaction:

(6) $2FeSO_4 + H_2SO_4 + 0.5O_2 = Fe_2(SO_4)_3 + H_2O$.

Under atmospheric conditions, at the temperature of 90-95° C., with a delay of 6-10 hours, there is achieved a zinc recovery as high as 99%.

In the beginning of the strong acid leaching stage, the sulphuric acid content is maintained high, about 50-90 g/l, and in the end of the stage it is kept within 10-25 g/l. The purpose is that the acid content is maintained high and the ferric iron content relatively low, below 10 g/l, so that the lead is made to be precipitated as sulphate, without its turning into jarosite. If the final sulphuric acid content were lower, it would improve the precipitation conditions to be more suitable in the iron precipitation stage, but at the same time it would cause, as was pointed out above, the lead and iron to be precipitated as jarosite.

In addition to lead sulphate, the residue takes in the silicon oxide, non-dissolved sulphides, elemental sulphur and precious metals. The strong acid leaching stage is also adjusted so that all of the ferric iron is used up before the solution is conducted further.

The residue from the strong acid leaching can as a whole be conducted into pyrometallurgical treatment. Thus the dried leaching residue is conducted, together with sand and limestone, to a flash smelting furnace, where oxygen is fed, too. In the reaction shaft the feed reacts with oxygen, so that the released heat melts the feed, decomposes the sulphates contained therein and partly volatizes the lead. The major part of the lead is, however, recovered from the lead layer accumulated on the bottom of the furnace, which layer also contains the precious metals. Sand, limestone and oxidized iron form the main part of the slag layer formed on top of the metallic lead. Led bullion and slag are removed from the furnace and processed in methods known in the prior art.

The solution which is obtained from the strong acid leaching and contains the ferrosulphate is conducted to the oxidation stage, which is most practically carried out in a known method in an autoclave, wherefrom the iron is obtained as hematite, and in addition there is obtained a small amount of elemental sulphur. The zinc sulphate solution is separated from these solid substances. The obtained residue is further subjected to flotation, and as a result the sulphur phase and the rest of the sulphides are separated from the iron residue, which is mainly hematite, but also contains a small amount of goethite and jarosite. The method described above is illustrated in the flowsheet 1.

A prerequisite for the strong acid leaching stage is that both the zinc ferrite, the leaching whereof is favoured by a high acid content, and the zinc sulphide, the leaching whereof is favoured by a high ferric iron content, are both dissolved as completely as possible. Another requirement for the leaching stage is to produce a ferrous sulphate solution, the sulphuric acid content whereof is as low as possible, which allows the iron to be precipitated as hematite. In order to fulfil both of these requirements, the strong acid leaching stage can be made a two-step process.

In the first step, the ferrite is leached according to the reaction (4), and in the second step the created ferric iron oxidizes the sulphides which were left undissolved, according to the reactions (1), (2) and (5). The sulphuric acid content of the first step is maintained fairly high, 50-90 g/l, by means of return acid to be fed into the step. Oxygen is not fed into the first step, which makes it possible to use simpler reactor types. The final leaching residue is discharged from this first step, and the solution enters the second step.

The bulk and/or zinc concentrate is fed into the second step of the strong acid leaching. In this step, the leaching is carried out by means of oxygen, i.e. first there is the reaction (6), where the bivalent ferrous iron is oxidized into trivalent ferric iron, which is followed by the reactions (1), (2) and (5), where sulphides are oxidized into sulphates. At this stage the sulphuric acid content is fairly low, about 10-25 g/l. In this step, the ferric iron has to be in the solution because of the leaching of sulphides, whereas with regard to the iron precipitation conditions, the iron should be in ferrous form, and therefore there is supplied a small concentrate addition in the end of this step in order to reduce the ferric iron. The amount of the concentrate addition is small with respect to the amount of bulk concentrate to be added to this step. Thereafter the residue and the solution are separated. The residue is conducted to the first strong acid leaching step, and the solution to the iron precipitation stage. The residue obtained from strong acid leaching can be conducted to pyrometallurgical treatment, where the precious metals are recovered from lead bullion. This alternative is illustrated in the flowsheet 2.

We have above described a process for conducting the residue obtained from strong acid leaching to pyrometallurgical treatment. The residue can also be conducted to flotation. The flotated fraction takes in the elemental sulphur and the small amount of sulphides which was left non-dissolved. In the non-flotated fraction, there remain among others lead sulphate, silicates and part of the precious metals. This fraction can be conducted to pyrometallurgical treatment for recovering the lead and precious metals.

If the concentrate fed into the strong acid leaching, either bulk concentrate or zinc concentrate, also contains pyrite, $FeS_2$, this is not dissolved during the leaching, but proceeds as pyrite to the flotation after the leaching. In the flotation the pyrite is flotated along with the elemental sulphur, but the separation of pyrite and elemental sulphur often is very difficult. Pyrite as such is not a particularly valuable material, but precious metals tend to go along with it. Therefore the separated pyrite must be treated for recovering the precious metals. One way is to feed the pyrite into roasting. The difficulties caused by the treatment of pyrite can be prevented by first heating the material to be fed into strong acid leaching, for instance in a rotary furnace, prior to conducting it into leaching. Heating at in a temperature of about 800° C. decomposes the pyrite into pyrrhotite FeS, but the other sulphides are not yet decomposed. The heating can be carried out either by burning the sulphur contained in the pyrite, or by using some external fuel. Pyrrhotite is dissolved in the strong acid leaching just as the other sulphides. Then the separation of elemental sulphur and sulphides after flotation becomes a simple clear filtering process, because the amount of sulphides is insignificant. But because part of the precious metals still goes along with these sulphides, the sulphides separated from the elemental sulphur can be circulated either to roasting or to the decomposition of pyrite.

Except from the decomposition of pyrite, the preheating has other advantages, too—among others it can be used for removing such organic materials contained in the concentrate that are harmful for the zinc process, for instance humus and flotation reagents. Part of such chlorides and fluorides that are harmful for the zinc process are also removed during the preheating. This alternative process is illustrated in the flowsheet of FIG. 3.

As is described above, the solution from the strong acid leaching is conducted to autoclave treatment for separating the zinc sulphate solution and for precipitating the iron as hematite. The zinc sulphate solution obtained from the various stages is conducted to normal solution purification, and thereafter to zinc electrolysis.

Among the advantages of the method of the present invention, let us point out for instance that it allows for the use of ordinary equipment already existing in the zinc plant, and thus the expensive autoclave technique can be avoided. The leaching of the whole amount of concentrate as sulphidic in atmospheric conditions requires a delay time of immoderate length, but when only part of the concentrate, either normal zinc concentrate or bulk concentrate, is fed into the treatment of roasted material, it is possible to succeed with only small changes in the equipment. In the method according to the invention, new reactors are only needed in such stages where oxygen is fed in. Thus for instance in the first step of the strong acid leaching, it is possible to use the existing reactors solely, and only part of the reactors in the second step of the strong acid leaching are replaced with new equipment.

Another essential point with the method is that the newly developed process is capable of recovering such valuable materials that before were lost both in atmospheric and autoclave leaching along with the jarosite residue. Yet another advantage of the method is that part of the sulphur content of the sulphidic concentrate is recovered as elemental sulphur instead of sulphur oxide.

I claim:

1. A method of recovering valuable materials including lead, gold and silver from zinc concentrate produced in connection with hydrometallurgical zinc production, comprising the steps of:
   (a) roasting at least part of the zinc concentrate and conducting it into neutral leaching in order to dissolve zinc oxide;
   (b) conducting non-dissolved zinc ferrite under atmospheric conditions to strong acid leaching carried out by means of sulphuric acid fed therein as return acid;
   (c) also conducting to said strong acid leaching zinc concentrate either in the form of ordinary zinc concentrate or bulk concentrate, in which case sulphides of the concentrate are oxidized mainly into sulphates and elemental sulphur owing to the influence of trivalent iron obtained from the leaching of ferrite and oxidized from ferrosulphate by means of oxygen;
   (d) obtaining from the strong acid leaching a solution and a residue which includes at least elemental sulphur, lead sulphate and gold and silver contained in said zinc concentrate; and
   (e) treating the solution from the strong acid leaching in an autoclave in order to obtain iron as hematite.

2. The method of claim 1 or 10 including keeping the content of ferric iron in the strong acid leaching 10 g/l.

3. The method of claim 1 or 10 comprising preheating the bulk and/or zinc concentrate fed into the strong acid leaching in order to decompose pyrite and to remove all organic matter.

4. The method of claim 1 or 10 comprising flotating the residue obtained from the strong acid leaching in order to recover materials therefrom.

5. The method of claim 1 or 10 comprising pyrometallurgically treating the residue obtained from the strong acid leaching in order to recover valuable materials.

6. The method of claim 1, including carrying out the strong acid leaching in two steps:
   (a) first leaching ferrites obtained from the neutral leaching with return acid and conducting a resulting solution to a second step;
   (b) supplying oxygen to the second step for oxidizing bivalent iron contained in the solution from (a) into trivalent ferric iron, which again oxidizes bulk and/or zinc concentrate fed into this second step;
   (c) returning residue created in the second step to the first strong acid leaching step, where ferric iron created in the leaching of ferrites oxidizes sulphides of the bulk and/or zinc concentrate that were left unoxidized in the second step, into sulphates; and
   (d) conducting residue from the first step to further treatment for recovering sulphur and other valuable materials.

7. The method of claim 1 or 6, comprising feeding return acid into the first step of the strong acid leaching in order to dissolve ferrites, so that the sulphuric acid content is adjusted within the range of 50-90 g/l.

8. The method of claim 1 or 6 and including feeding bulk and/or zinc concentrate into the second step of strong acid leaching, and adjusting the sulphuric acid content within the range of 10-25 g/l.

9. The method of claim 1 or 6 including feeding some concentrate, the amount of which is small compared to the amount of zinc concentrate fed into the process at the beginning, into the second step of the strong acid leaching.

* * * * *

UNITED STATES PATENT AND TRADEMARK OFFICE
CERTIFICATE OF CORRECTION

PATENT NO. : 5,120,353
DATED : June 9, 1992
INVENTOR(S) : Sigmund P. Fugleberg et al It is certified that error appears in the above-identified patent and that said Letters Patent is hereby corrected as shown below:

Column 1, line 11, "out a conditions" should read:
--out under atmospheric conditions--.

Column 4, line 50, "Heating at in a" should read:
--Heating at a--.

Column 6, line 9, "claim 1 or 10" should read:
--claim 1 or 6--.

Column 6, line 11, "claim 1 or 10" should read:
--claim 1 or 6--.

Column 6, line 15, "claim 1 or 10" should read:
--claim 1 or 6--.

Column 6, line 18, "claim 1 or 10" should read:
--claim 1 or 6--.

Signed and Sealed this

Thirty-first Day of August, 1993

*Attest:*

BRUCE LEHMAN

*Attesting Officer*   Commissioner of Patents and Trademarks